May 16, 1933.  J. W. VAN METER  1,908,876
METHOD AND MEANS FOR RECOVERING VALUES FROM ORE DUMPS
Filed Oct. 26, 1931    3 Sheets-Sheet 1
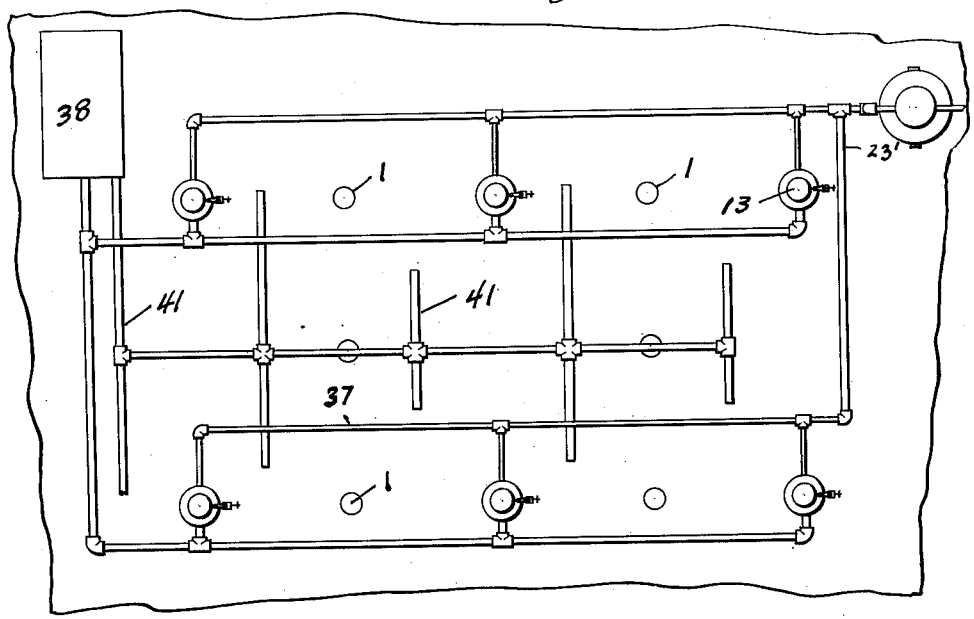
Fig. 1.
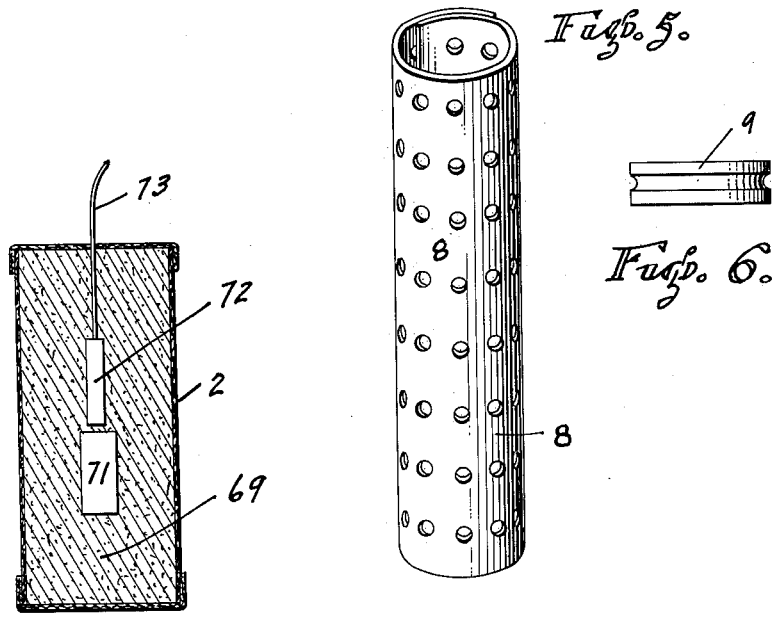
Fig. 4.
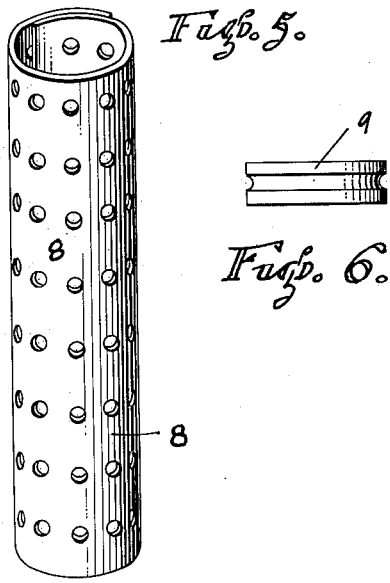
Fig. 5.
Fig. 6.
INVENTOR
James W Van Meter May 16, 1933.    J. W. VAN METER    1,908,876
METHOD AND MEANS FOR RECOVERING VALUES FROM ORE DUMPS
Filed Oct. 26, 1931    3 Sheets-Sheet 3
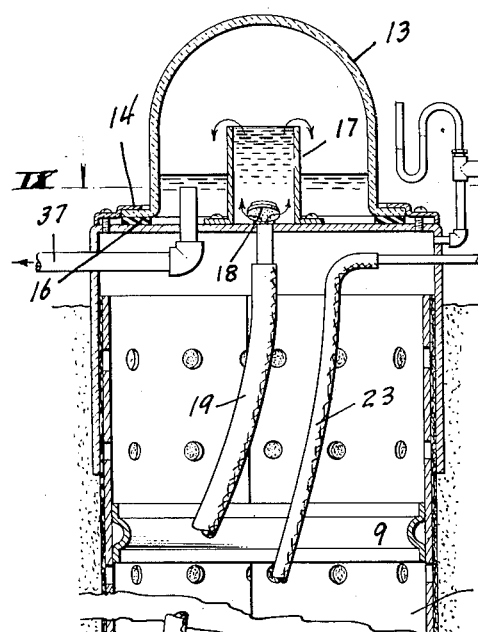
Fig. 7.
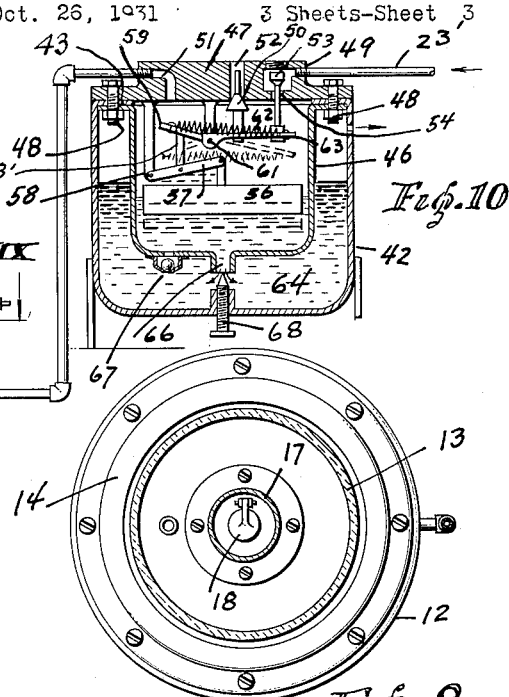
Fig. 10.
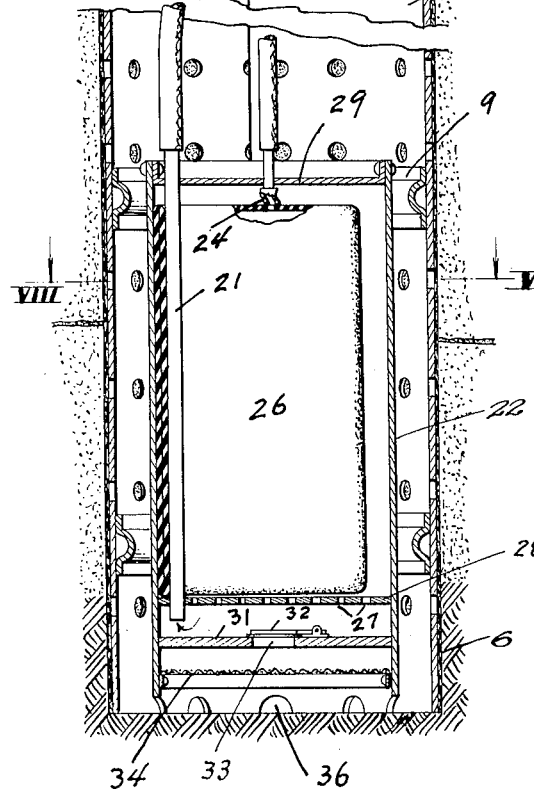
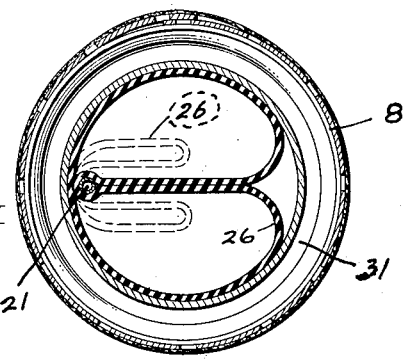
Fig. 9.
Fig. 8.
INVENTOR
James W. Van Meter Patented May 16, 1933

1,908,876

UNITED STATES PATENT OFFICE

JAMES W. VAN METER, OF LOS ANGELES, CALIFORNIA

METHOD AND MEANS FOR RECOVERING VALUES FROM ORE DUMPS

Application filed October 26, 1931. Serial No. 571,243.

The present invention is an improved method and apparatus for the recovery of mineral values from tailing dumps or mill tailings.

Throughout the country there are today many old and abandoned tailing dumps which contain precious metals in minute form and assays prove the existence of said values which are present because the original recovery methods were but partially efficient or were wasteful in light of modern scientific knowledge.

Many of these dumps are rich in values but the cost of recovery is often prohibitive because of the voluminous mass of earth to be handled before treatment.

Again Federal laws prohibit the pollution of streams by flooding them with tailings.

I have evolved a method and means for the treatment of such dumps and the recovery of the mineral values therein without removing the mass of finely ground material which remains in place where originally deposited.

The primary object of my invention is the provision of a method for recovering values from such dumps and the provision of apparatus for effectively extracting values, said apparatus and complete equipment being removable from the property and available for repeated use, and requiring no permanent installation.

In operating my method of treatment a given area of dump ground is checkerboarded with drill holes extending from the surface of the dump downward to a point approximately a foot below the surface of the earth upon which the dump rests.

I have found that these holes when placed three feet apart in all directions effect a very complete recovery. I prefer five inch holes. Between these holes, and equidistant therefrom, I bore two and a half inch holes to receive an expansive and chemical charge, which when discharged breaks up the mass and liberates a treating fluid which permeates the ruptured mass of material to be treated. It will be understood that if the dump is very deep a vertical series of such charges will be employed whereas if but ten feet deep the charge would be five or six feet from the surface.

Figure 2:
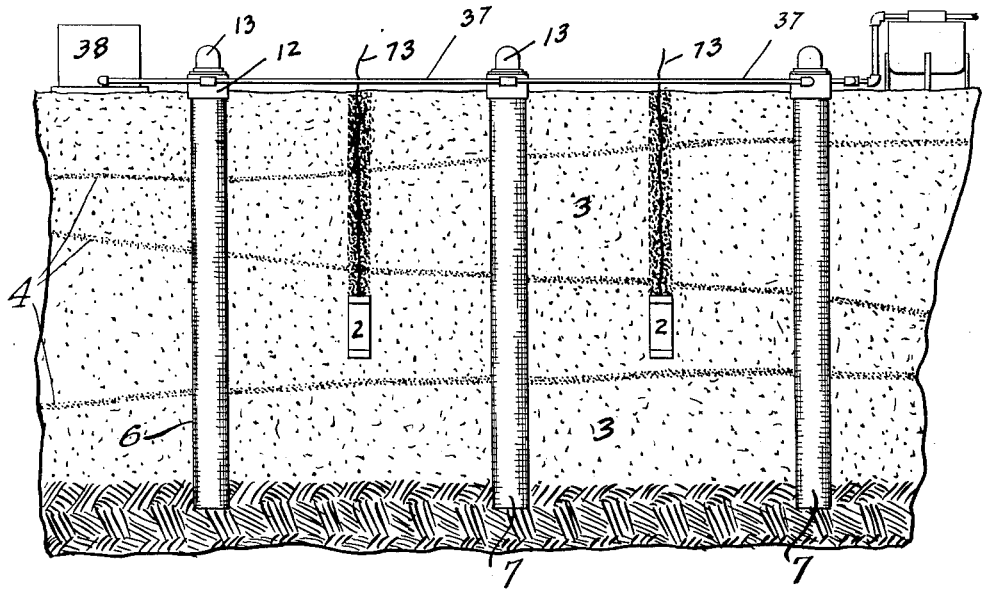
Figure 3:
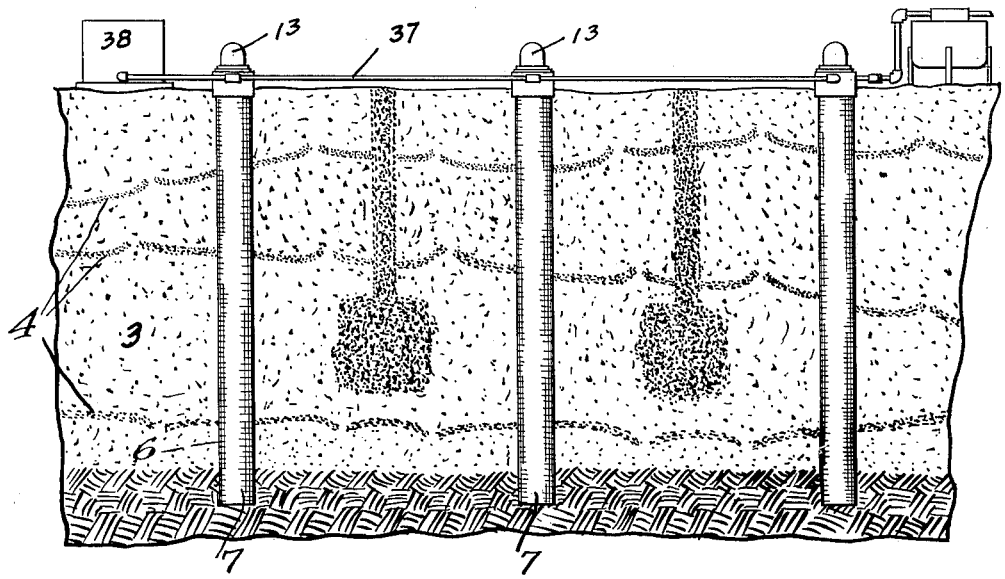

In the accompanying three sheets of drawings, Figure 1 is a top plan view of a fragment of dump and illustrates the arrangement of pipes, receptacles, and apparatus for carrying out my process, Figure 2 is a vertical cross section of Figure 1 showing explosive charges placed in the dump, but not exploded, Figure 3 is a view similar to Figure 2 showing conditions in the dump after the charges have been exploded.

Figure 4 is a vertical cross sectional view of a chemical cartridge containing an expansive charge and the necessary elements of producing a gaseous vapor adapted to attack minerals in the dump, Figure 5 is a perspective view of a foraminous, expansive screen member, Figure 6 is a side view of an expanding ring for the part shown in Figure 5, Figure 7 is a vertical cross section of a five inch hole containing a filter tube, Figure 8 is a cross section of Figure 7 taken on the dotted line VIII—VIII of Figure 7, Figure 9 is a section of Figure 7 taken on the line IX—IX of said figure.

Figure 10 is a central cross section showing a valve mechanism for the control of compressed air to and from the filter tube shown in Figure 7.

Referring to the drawings, Figures 1, 2, and 3, the numeral 1 indicates a vertical bore adapted to receive a charge of explosive in a cartridge 2. Said bores 1 are made at suitable intervals throughout a dump (3) to be treated for the recovery of minerals.

Throughout the mass of the dump occur strata (4) of relatively dense and comparatively impervious material caused by the deposition of slimes, each stratum representing a mill run or working season of the mill which created the dump.

After cartridge (2) is discharged these strata are broken up, as indicated in Figure 3, permitting the dissemination throughout the dump of gases or fluids liberated by the discharge and which will be later described.

Positioned equidistantly from the bores (1) are larger bores (6) of greater depth as well as diameter, each bore extending through the dump and into the ground beneath as shown in Figures 1 and 2.

Each bore (6) contains a filter tube (7) shown in detail in Figure 7. A sheet of screen (8) is rolled to assume the position shown in Figure 7 and is expanded by means of rings (9). A sheet of fabric (11), such as burlap, is wrapped around the expanded screen (8).

A filter tube thus formed is lowered into each bore (6). The charges in bores (1) are discharged and the ground thoroughly shattered.

When this is done a small dyke or embankment is formed around the drilled area and the dump is flooded until a thin sheet of water remains on the surface which indicates that the dump is saturated and all of the filter tube bores (6) are filled.

This method insures a complete and immediate saturation and soaks the dump from the base to the surface by lateral filtration from the tubes in bore (6). The speed with which the dump can be saturated is a valuable feature of my method and it prevents loss of solution through the subsoil.

After saturation of the dump, the filter tubes are capped by caps (12) which are slipped over the tops of said tubes and secured by tamping the surrounding ground.

In order to provide a visible control of the fluid through the filter tubes and for examination during the operation I provide a transparent dome (13) secured by an annular flange (14), to the cap (12). A gasket (16) seals the dome against leakage.

An overflow tube (17) is secured to the roof of cap (12) and surrounds a check valve (18) preventing a return flow of fluid through a hose (19) connected to one end of a pipe (21) secured to and extending through a barrel (22).

Barrel (22) is attached to cap (12) by hose (19) and by a hose (23) one end of which extends outwardly, Figure 7 through the wall of cap (12) and the other end of which terminates within the barrel (22), being attached to a nipple (24) on a rubber bag (26). Bag (26) is secured against side wall of barrel (22) by pipe (21) and divides the bag in the middle as indicated in Figure 8.

The purpose of bag (26) is to be distended from the collapsed, deflated position indicated by dotted lines, Figure 8, to its full line position and thereby displace fluid from barrel (22) when said bag is inflated by compressed air through tube (24).

When this occurs fluid is forced through perforations (27) in a partition (28) in barrel (22).

Barrel (22) is a tube closed at both ends by flanged caps (29 and 31). Cap (31) is provided with a check valve (32) controlling an inlet opening (33), the bottom of barrel (22) is screened as indicated at (34) and provided with semi-circular openings (36) to admit solution when the barrel rests on the bottom.

When the elastic bag contracts upon release of air the collapse of said bag creates a partial vacuum in barrel (22) which opens check valve (32) refilling barrel (22) with solution, or if solution be exhausted, with air, said bag functioning thereafter as a vacuum pump.

Solution in barrel (22) is forced continually by this means through pipe (21) and hose (19), past check valve (18) through overflow (17), through a pipe (37) to a zinc precipitation vat (38) for recovering the values in solution, and the leaching solution overflows and is distributed through the pipe line (41) over the surface of the dump resaturating same and being recirculated through the system as described until assay tests indicate no values.

Bag (22) is inflated by compressed air admitted through a line (23).

In order to cut off the supply of compressed air to permit the bag (22) to empty itself by the elasticity of its walls, I interpose on the air line the mechanism shown in Figure 10, which also determines the periodicity of the pump pulsations.

This mechanism consists of a bowl (42) having an inturned flange (43) which registers on a smaller bowl (46). Both bowls are secured to a cap (47) by bolts (48).

Cap (47) has an inlet port (49) and an outlet port (51) to which said ports is connected air line (23).

Said cap (47) is also provided with a vent (52) which releases compressed air to the atmosphere during the time that the bag (22) is deflating automatically.

Inlet passage (49) is controlled by a valve (53) adapted to seat on a port (54) but normally maintained in open position by a float (56) pivoted to one end of a lever (57) fulcrumed at (58). Pivoted to lever (57) is one end of a link (58) which is connected at its opposite end to a lever (59) fulcrumed at (61).

A compression spring (62) is connected at one end to the lever (59) and at the opposite end to a lever (63) also fulcrumed at (61).

Liquid (64) in the bowls (42 and 46) raises and lowers float (56). Compressed air in bowl (46) forces the liquid therein through a port (66) leading to bowl (42) displacing air therein to an outlet through a vent (67).

This lowers float (56) whereupon spring (62) moves lever (63) seating valve (53) shutting off compressed air, and unseats a valve (50) releasing the pressure in bowl (46) to the atmosphere.

At this point release of pressure in bowl

(46) permits float (56) to rise and liquid (64) reenters bowl (46) through a ball controlled vent.

The interval of time in which the valve action takes place is predetermined by a cone pointed screw (68), the point of which extends into port (66).

The operation of my invention is as follows: Assuming the dump to have been bored as described a cartridge (2), Figure 4, is lowered in each bore (1). Each cartridge consists of a closed container of any suitable form filled with calcium cyanide (69) in which is embedded a vessel (71) of liquid chlorine and a stick (72) of dynamite or other suitable explosive or expansive agent, provided with a firing fuse (73).

The charges in bores (1) are then fired simultaneously resulting in the fracture and lifting of the dump.

The intense heat developed by the various explosions vaporizes the inert chemical ingredients in the cartridge creating a gaseous vapor which is disseminated through the loosened surrounding soil and attacking the mineral elements therein, preparing them for subsequent leaching operations.

I now flood the surface filling all the filter tubes and saturating the soil loosened by the explosions.

The barrels are inserted in the filters and caps adjusted thereon and the filters are connected in series by hoses as indicated in Figure 3.

Compressed air is admitted through the line thus formed, inflating bags (26) displacing the leaching solution from barrels (22) through the line to precipitation tank (38) from which it overflows, to the surface of the ground.

This overflow gravitates into the dump and the partial vacuum created by the collapse of bags (26) sucks it into barrels (22) again. The operation is repeated until such time as assays show the leaching solution to contain no values.

While I have here described a charge of dynamite exploded in the presence of calcium cyanide and liquid chlorine to produce a vapor which will attack the metallic elements in the tailings. I have also used carbon saturated with liquid oxygen and exploded in the presence of sodium cyanide with equally good results.

I do not wish to limit myself to the chemicals or expansive agents specified, but can use any suitable chemical in combination with any suitable explosive agent capable of vaporizing and disseminating a gaseous product throughout the body of tailings without departure from the spirit of my invention.

I claim:—

1. That method of extracting values from ore dumps which consists in boring said dump at intervals, shattering said dumps by explosion of charges containing chemical elements adapted to create a gaseous vapor which will attack mineral elements, and leaching said shattered ground laterally into said bores, extracting said leaching solution laterally into said bores, and discharging said solution upwardly to a recovery vat.

2. The method of extracting metallic values from ore tailing dumps by boring said dump at intervals, shattering said dump by explosion therein of a chemical reagent which converts said metallic elements into a compound soluble in water, saturating said dump to form an aqueous solution of said compound, and recovering the metal from said solution.

3. That step in a method of recovery of metallic values in an ore tailing dump which consists in shattering said dump by an explosive charge with which is associated a chemical reagent effective to convert said metallic elements into a water soluble compound.

In testimony whereof, I hereby affix my signature.

JAMES W. VAN METER.